Jan. 29, 1963   C. E. WINTER   3,075,397
MULTIPLE SPEED GEAR TRANSMISSION AND TOOTH CONSTRUCTION
Filed July 27, 1960

INVENTOR.
CARL E. WINTER
BY
Elliott & Pastoriza
ATTORNEYS ated Jan. 29, 1963

3,075,397
MULTIPLE SPEED GEAR TRANSMISSION
AND TOOTH CONSTRUCTION
Carl E. Winter, 1051 Kinnard Ave., Los Angeles 24, Calif.
Filed July 27, 1960, Ser. No. 45,761
10 Claims. (Cl. 74—321)

This invention generally relates to a gear transmission and improved tooth construction associated therewith, and more particularly concerns an improved multiple speed gear transmission for particular application in instances in which a variable output speed is desired from a constant source of input power. The invention further contemplates an improved tooth construction which may be advantageously employed with the improved gear transmission as well as in other gearing applications in which equivalent functions are desired.

To obtain a better understanding of the problems involved as well as the functioning of the improved gear transmission of the present invention, reference may be had to applicant's issued Patent No. 2,870,644, dated January 27, 1959, and entitled "Improved Multiple Speed Gear Transmission."

In the previously identified patent, applicant disclosed in a preferred construction first and second rotating means designed to alternately be in rotating meshing engagement with a pinion member. Towards this end, Patent No. 2,870,644 provided for spaced gear rack sectors on each of the two rotating means.

One of the objects of the present invention is to provide an improved multiple speed gear transmission in which only a single rotating means may be coupled for meshing engagement with the pinion member, and yet in which a gear transmission is provided susceptible of variable speed operation in accordance with discrete increments of speed.

Another object of the present invention is to provide an improved multiple speed gear transmission embodying semi-automatic means for effecting changes in speed while at the same time maintaining a continuous driving force.

Another object of the present invention is to provide an improved multiple speed gear transmission which may be readily constructed with a minimum number of parts in such a manner that substantially maintenance-free operation is attained.

Still another object of the present invention is to provide an improved multiple speed gear transmission which will yield an appreciable number of output speeds by increased or decreased increments.

Still a further object of the invention is to provide an improved multiple speed gear transmission adapted to embody in one form a novel tooth construction in the pinion member, whereby a greater structural strength is achieved.

These and other objects and advantages of the present invention are generally achieved by providing in a gear transmission a shaft with a pinion mounted on the shaft. Rotating means are provided and include gear rack means with the gear rack means being defined, at least in part, by a plurality of parallel teeth. The gear rack means are positioned so as to mesh with and drivingly engage the pinion.

As a primary feature of the present invention, shifting means are provided and designed to effect axial movement between the pinion and the rotating means during a given angular portion of a cycle of revolution of the rotating means in response to movement of said rotating means.

In a preferred embodiment, a novel "diamond" shaped tooth means may be employed.

A better understanding of the present invention will be had by reference to the drawings, showing merely an illustrative, partially schematic embodiment, and in which.

Figure 1:
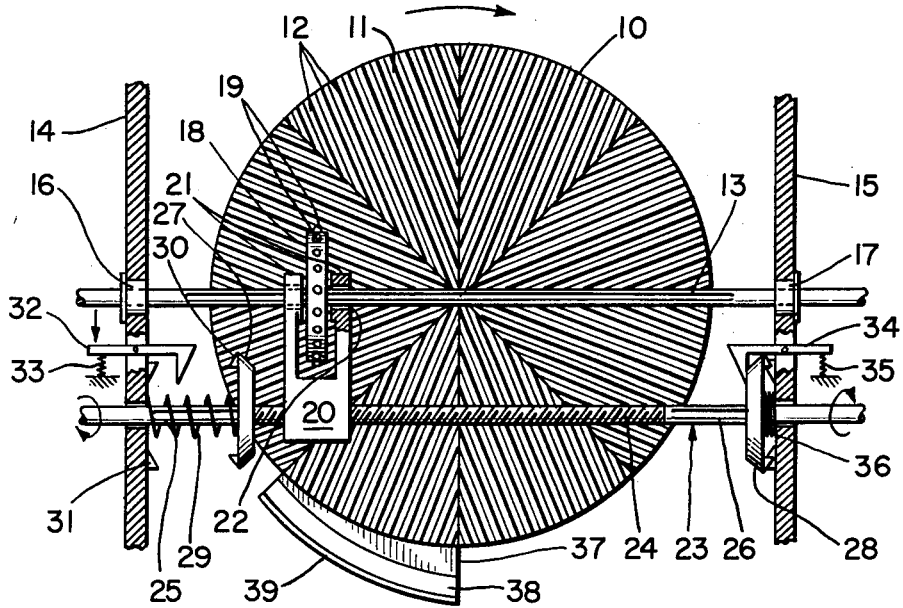
FIGURE 1 is a top plan view, partially schematic, showing the improved multiple speed gear transmission according to the present invention.

Referring now to the drawings, there is shown in FIGURE 1 a rotating means in the form of a disc-like plate 10 having formed on the surface thereof a plurality of gear sectors 11 in contiguous relationship. Each of the sectors 11 has formed on the face thereof a plurality of teeth 12 in parallel relationship. The teeth 12 are parallel to a line bisecting the sector angle. For example, in the construction shown in FIGURE 1 for illustrative purposes, each of the gear sectors 11 subtends an angle of 45 degrees. In consequence, the line bisecting such angle would define, with the radii forming the sector, angles of 22½ degrees. In this respect, the sectors are constructed identically in the manner disclosed in Patent No. 2,870,644 heretofore described.

A shaft 13 of splined construction is disposed above the rotating means or gear plate 10 and may be supported, for example, by end members 14 and 15. Towards this end, bearings would be provided at 16 and 17 to journal the shaft 13.

Mounted on the shaft 13 for rotation therewith is a pinion member 18 provided with teeth 19. The teeth 19 may be of the "peg"-type form as disclosed in Patent No. 2,870,644 or may take another form in accordance with the present invention as will be described further as the specification proceeds.

The pinion is axially fixed for movement with a connecting member 20. The member 20 may include bifurcated arms 21 or the like designed to engage the pinion 18. The arms 21 are provided with openings 22 encircling the shaft 13 but radially spaced therefrom. If desired, bearings (not shown) may be provided in the openings 22. It should be noted that the member 20 is not normally connected in any way to the shaft 13 or the pinion member 18.

The lead screw 23 includes a section 24 threadedly coupled to the connecting member 20, and terminates at its opposite ends in a splined portion 25 and another splined portion 26.

Mounted on the lead screw 23 on the splined portions 25 and 26, respectively, is a member 27 and another member 28. Member 27 is shown in its operating position towards which it is biased by a spring means 29. The member 27 includes inner teeth 30 designed to cooperate with teeth 31 connected to the support member 14. The teeth 30 and 31 define a cooperating configuration such that the member 27 is locked against rotation in the direction of the arcuate arrow (adjacent thereto), but is free to rotate in the opposite direction.

In order to lock the member 27 in its position adjacent the support member 14, a latching means 32 is provided which may have connected thereto a spring member 33 urging the latching member to the horizontal position indicated such that the member 27 will be locked thereunder when it is adjacent the support member 14.

The position of the member 27 in its non-operating location may be more clearly illustrated by looking at the member 28 (identical to the member 27) shown in such position in FIGURE 1. Thus, the member 28 is retained in its non-operating position by a latch member 34 urged downwardly by a biasing spring 35. The spring 36 biasing the member 28 toward its operating position is compressed thereby urging the member 28 towards its operating position upon release of the latch member 34. Of course, the operating position of the member 28 would be similar to that in which the member 27 is shown and disposed.

Affixed to the plate 10 and extending radially from one of the sectors 11 thereof is an actuating means in the form of an extension member 37 having formed thereon a track 38 adapted to be engaged by the member 27 and also by the member 28 when the latter is in its operating position. The track 38 terminates radially outwardly in a rim portion 39 which extends upwardly a sufficient distance to prevent the members 27 and 28 from engaging the track 38 except at the radially inner end thereof. The inter-relation and operation of the parts thus far described in the improved gear transmission according to the present invention may now be explained.

In operation, the rotating means 10 may either be the driven or driving member. Assuming that the rotating member 10 is the driven member, some type of power source or prime mover would be coupled to the shaft 16 to in turn drive the pinion 18 and rotate the gear sector plate 10. By employing "peg"-type teeth 19 on the pinion 18, the pinion 18 may be shifted axially on the shaft 16 to in turn vary the speed of rotation of the gear sector plate 10 in a manner well known in the art. This operation is analogous to that disclosed in the above-referred-to patent except that only a single driven rotating means 10 is employed in this instance. By using the "peg"-type teeth 19, as described in Patent No. 2,870,644, it is feasible to maintain the pinion 18 in a plane, as shown in FIGURE 1, normal to the shaft 16 and yet enable it to engage the parallel teeth 12 as they mesh therewith.

The difficulty, however, in using a single rotating means or gear plate 10 is the fact that the sectors 11 must be contiguous, and as a consequence at certain radii on the plate 10 the junctures between adjoining teeth 12 of adjacent sectors 11 will prevent the pinion teeth 19 from properly meshing with the gear sector teeth 12.

Figure 2:
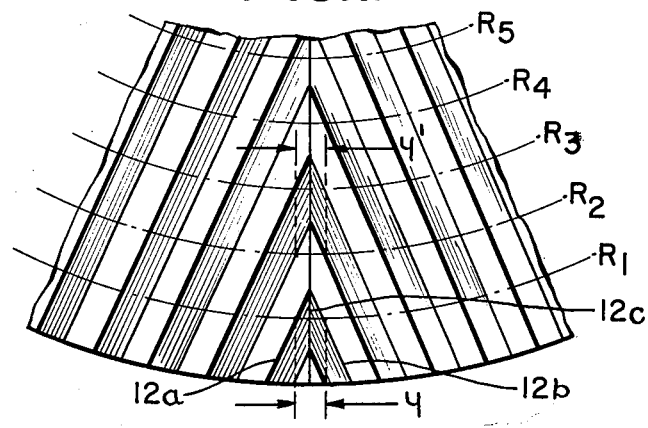
FIGURE 2 is an enlarged portion of a part of two adjacent gear rack sectors shown in FIGURE 1; and, FIGURE 3 is an illustration of the meshing of the improved tooth design of the present invention; and, FIGURE 4 is a perspective view of the improved tooth design according to the present invention.

This particular problem is more clearly illustrated in FIGURE 2 wherein the teeth 12a and 12b of adjoining sectors connect along a line 12c. It is apparent that in order to maintain engagement of the pinion teeth 19 with the plate teeth 12, it is necessary that the spacing between the gear sector teeth 12 and width of same must be maintained equally. Thus, it is only at certain discrete radii R1, R2, R3, R4, R5, and the like, at which the distances Y and Y' are equal, respectively, to the width of the teeth 12 and the spacing in between, respectively. In consequence, it is desirable that the pinion 18 always be in engagement with the gear sector plate 10 along one of these specified radii.

It is towards this end that a primary feature of the present invention is directed. Normally, the members 27 and 28 are in a position as indicated by the clutch member 28 in FIGURE 1. In the event it is desired to shift from a radius of R1 to a radius of R2, for example, to vary the rotational speed of the plate 10, the latching member 32 is forced downwardly in the direction of the arrow such that it is uncoupled from the member 27, whereby the member 27 assumes the position (as shown in FIGURE 1) under the biasing action of the spring 29. In the event the member 27 engages the extenison member 37 at a time when the extension member 37 has already begun to pass under the member 27, the member 27 will merely have its outer face engage the rim 39 and no rotation of the member 27 will occur. However, assuming that the member 27 moves outwardly at any other time, the extension members 37 and 27 will eventually come into the relative positions indicated in FIGURE 1. As soon as the extension member 37 begins to pass under the member 27, the member 27 will engage the track 38 and be rotated thereby. As the plate 10 continues to rotate in a clockwise direction, for example, as viewed in FIGURE 1, the track 38 of the extension member 38 will drive the member 27 back towards its position adjacent the support member or end plate 14 such that the member 27 will be latched by the latching member 32 at the end of its rotative travel along the track member 38.

It will be appreciated that as the member 27 is driven by the track 38, the shaft 23 will be rotated because of the splined relationship between the member 27 and the shaft 23. By proper design calculations, the degree of rotation of the member 27 will be sufficient to advance or rotate the screw 23 a given amount to axially advance the connecting member 20 a given length along the splined shaft 13 such that the pinion 18 (to which the connecting member 20 is axially coupled) will be advanced from the radius R1 to the radius R2.

It will be appreciated that rotation of the shaft 23 will necessarily also cause movement of the member 28. In consequence, a ratchet tooth arrangement, similar to cooperating teeth 30 and 31, is also provided on the member 28 and end plate 15 such that the member 28 may rotate in a direction in accordance with the rotation of the shaft 23 as effected by engagement of the member 27 with the track 38.

In the event the pinion 18 were to be advanced back to the original radius R1 from the radius R2, for example, the opposite member 28 would be employed to operate in exactly the same manner as the member 27. In such event, the latch member 34 would be released to allow the spring means 36 to urge the member 28 inwardly to engage the track 38 as the gear sector plate rotated in a clockwise direction. Such engagement would cause the shaft 23 to rotate in an opposite direction and thus effect movement of the threaded connector 20 in an opposite axial direction and a corresponding reverse axial movement of the pinion 18 along the splined shaft 13. Again, it should be noted that the member 27, because of the ratchet arrangement between the teeth 30 and 31, will be able to rotate with the shaft 24 despite its position adjacent the end plate 14.

In this regard, the member 27 will be locked, however, against rotation in the direction corresponding to its rotative engagement with the track 38; similarly, the member 28 will be locked against rotation in a direction corresponding to its rotative engagement with the track 38. As a consequence, at the end of travel upon the track 38, whichever member 27 or 28 is being employed will be stopped immediately against further rotation such that the pinion 18 will always be positioned over one of the discrete radii R1, R2, R3, R4, R5, and the like.

Of course, the overall purpose of the members 27 and 28 and the extension member 37, as well as the cooperating elements, is to effect a given axial movement of the pinion 18 while it is engaging one of the gear sectors 11 between the boundaries thereof such that the shifting will not occur over one of the juncture points, 12c for example, but rather within the angle which the particular sector 11 subtends. Thus, the relative position of the pinion 18 to the extension member 37 should be determined towards this end. Of course, the primary purpose is to make sure that in the shifting process, the pinion 18 is moved to one of the discrete radii R1, R2, R3, R4, R5, and the like.

It will be appreciated that the structure shown for illustrative purposes, although preferred, may vary considerably by substitution of various mechanical and electrical equivalents. The latching member 32 is only shown for descriptive purposes and could be replaced, for example, by a magnetic means tending to hold the member 27 adjacent the plate 14. Furthermore, the extension member 37 could be replaced (for example) by a servo-motor coordinating movement of the lead screw 23 with movement of the plate 10 throughout a given portion of its cycle of revolution. The structure shown for illustrative purposes, merely sets forth a mechanical manner of achieving the end desired, that is, shifting the pinion 18 between discrete radii R1, R2, R3, R4, R5, and the like and at the same time accomplishing this shifting while the pinion is engaging the teeth of any given sector and not crossing between sectors.

Although the "peg" type tooth 19 is believed satisfactory for employment on the pinion 18, it may be desirable under certain circumstances to use a tooth having more mass and corresponding structural strength. In accordance with the present invention, a "diamond"-shaped tooth 40 could be used in place of the "peg" type tooth 19. The tooth 40 has merely been referred to as "diamond" shaped for purposes of description although it actually has a somewhat different shape which may be explained in conjunction with FIGURE 3.

Figures 3, 4:
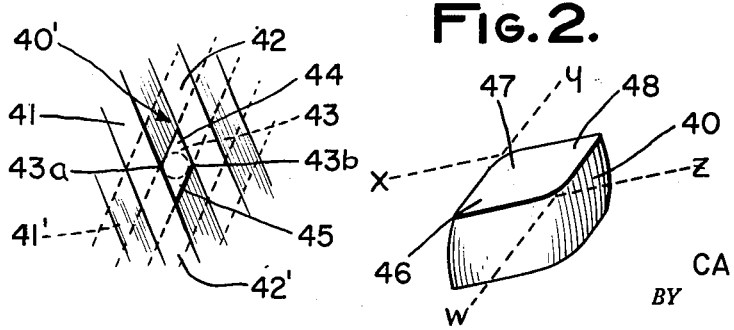

In FIGURE 3, there is shown a pair of spaced teeth 41 and 42 which would correspond to teeth 12 on the gear plate 10. These teeth 41 and 42 are shown in a solid line position. Other parallel teeth of the same particular sector are indicated by the dotted line showing at 41' and 42'.

Thus, the solid line position of teeth 41 and 42 would indicate the teeth adjacent one boundary of a sector 11 as they pass into engagement with the pinion 18; on the other hand, the teeth 41' and 42' would indicate the teeth at the other boundary of the same sector 11 as they pass beneath the pinion 18.

It will be appreciated that the teeth 41 and 42 will be at an angle of 22½ degrees with respect to an imaginary vertical, and similarly, the teeth 41' and 42' would also be at an angle of 22½ degrees with respect to the same imaginary vertical line. In consequence, by super-imposing teeth 41 and 42 over teeth 41' and 42', a parallelogram 40' will be formed having acute angles of 45 degrees and obtuse angles of 35 degrees.

If this same illustration of superimposition were set forth with respect to each pair of adjacent teeth of the particular sector 11 as they meshed with the pinion 18, it would be seen that the "peg" type tooth indicated by the numeral 43 would only have its opposite arcuate side portions 43a and 43b engage the pinion teeth, regardless of the particular teeth of the sector passing thereunder. In consequence, it is only necessary that the tooth shape be circular in the arcuate portions 43a and 43b or over an arc defined by opposing tangents intersecting at an angle of 135 degrees, or more generally an angle defined by subtracting the sector angle from 180 degrees.

Thus, the remainder of the "diamond" shaped openings 40' as defined by the triangular portions 44 and 45 could be embodied in the tooth form 40 to increase its mass and in some instances increase the engaging force as the tooth 40 meshed with the teeth 41 and 42, for example.

Therefore, the "diamond"-shaped tooth 40 would constitute an involute of a cross-sectional shape corresponding to the shape 40' and including a generally triangular end portion 46, opposing arcuate portions 47 (defined by 135 degree intersecting tangents X—Y and W—Z) and another triangular shaped portion 48. By imposing this particular cross section on an involute, an improved tooth structure would be obtained which would function better in certain instances than the "peg" type tooth 19.

It will be appreciated that the tooth structure 40 may be employed in other applications in which similar problems are involved to achieve equivalent functions.

It will be evident to those skilled in the art that various modifications and changes may be made in the improved multiple speed gear transmission and tooth construction of the present invention without departing from the spirit and scope thereof as set forth in the following claims.

What is claimed is:

1. In a gear transmission: a shaft; a pinion mounted on said shaft; rotating means; gear means on said rotating means, said gear means being defined at least in part by a plurality of parallel teeth and being positioned so as to mesh with and drivingly engage said pinion; and shifting means responsive to movement of said rotating means designed to effect axial movement of said pinion on said shaft during a given angular portion of a cycle of revolution of said rotating means.

2. The subject matter, according to claim 1, in which said shifting means comprises: first means driven by said rotating means during said given angular portion of a cycle of revolution of said rotating means; and, second means coupled between said clutch means and said pinion for effecting axial movement of said pinion in response to driven movement of said first means.

3. The subject matter, according to claim 1, in which said teeth of said pinion are of "peg" type construction characterized by an involute imposed on a cylinder.

4. In a gear transmission: a shaft; a pinion mounted on said shaft; rotating means; gear means on said rotating means, said gear means being defined at least in part by a plurality of parallel teeth and being positioned so as to mesh with and drivingly engage said pinion; an actuating member fixed for rotation with said rotating means; a first means movable between a first position of non-engagement to a second position of engagement with said actuating member; and second means coupled between said first means and said pinion for effecting axial movement of said pinion in response to said engagement of said first means with said actuating member.

5. The subject matter, according to claim 4, and latch means retaining said first means in said first position.

6. The subject matter, according to claim 4, and force means biasing said first means towards said second position.

7. The subject matter, according to claim 4, in which said actuating member is designed to drive said first means from said second position to said first position.

8. In a gear transmission: a shaft; rotating means; gear means on said rotating means, said gear means being defined at least in part by a plurality of parallel teeth and being positioned so as to mesh with and drivingly engage said pinion; an actuating member fixed for rotation with said rotating means; a first means movable between a first position of non-engagement and a second position of given rotative directional engagement with said actuating member; a second means movable between a first position of non-engagement and a second position of opposite rotative directional engagement with said actuating member; and third means coupled between said first and second means and said pinion for effecting axial movement of said pinion in a first direction and second direction, respectively, in response to engagement of said first means and said second means, respectively, with said actuating member.

9. The subject matter, according to claim 8; support means; and, cooperative means on said support means and said first means locking said first means against rotation in said given rotative direction upon positioning of said first means in its first position.

10. The subject matter, according to claim 9, and cooperative means on said support means and said second means locking said second means against rotation in said opposite rotative direction upon positioning of said second means in its first position.

References Cited in the file of this patent

UNITED STATES PATENTS

| | | |
|---|---|---|
| 612,590 | MacDonald | Oct. 18, 1898 |
| 729,289 | De Loach | May 26, 1903 |
| 1,334,594 | Buffat | Mar. 23, 1920 |
| 1,418,355 | Bell et al. | June 6, 1922 |
| 1,596,153 | Chadborn | Aug. 17, 1926 |
| 1,766,266 | Stracke | June 24, 1930 |
| 2,870,644 | Winter | Jan. 27, 1959 |
| 2,921,479 | Thomas | Jan. 19, 1960 |